United States Patent [19]

Vanderzanden

[11] Patent Number: 4,629,511

[45] Date of Patent: Dec. 16, 1986

[54] HIGH FLOAT AND RAPID SETTING ANIONIC BITUMINOUS EMULSIONS

[75] Inventor: Eugene J. Vanderzanden, Piedmont, Calif.

[73] Assignee: Chevron Research Company, San Francisco, Calif.

[21] Appl. No.: 698,994

[22] Filed: Feb. 7, 1985

[51] Int. Cl.$^4$ .............................................. C08L 95/00
[52] U.S. Cl. .................... 106/277; 106/273 R; 252/311.5
[58] Field of Search ....................... 106/277, 273 R; 252/311.5

[56] References Cited

U.S. PATENT DOCUMENTS 2,855,319  10/1958  McConnaughay ............... 106/123
3,036,015  5/1962   Woodward ........................ 106/277

Primary Examiner—Amelia B. Yarbrough
Attorney, Agent, or Firm—J. A. Buchanan, Jr.; S. R. La Paglia

[57] ABSTRACT

The treatment of pavement surfaces with a rapid setting high float asphalt emulsion which comprises 50 to 75 weight percent asphalt, about 0.01 to 1.0 weight percent anionic emulsifier, about 0.2 to 15 weight percent carboxylic acid esters, sufficient base to provide said emulsion with a pH greater than about 9, and water.

5 Claims, 1 Drawing Figure

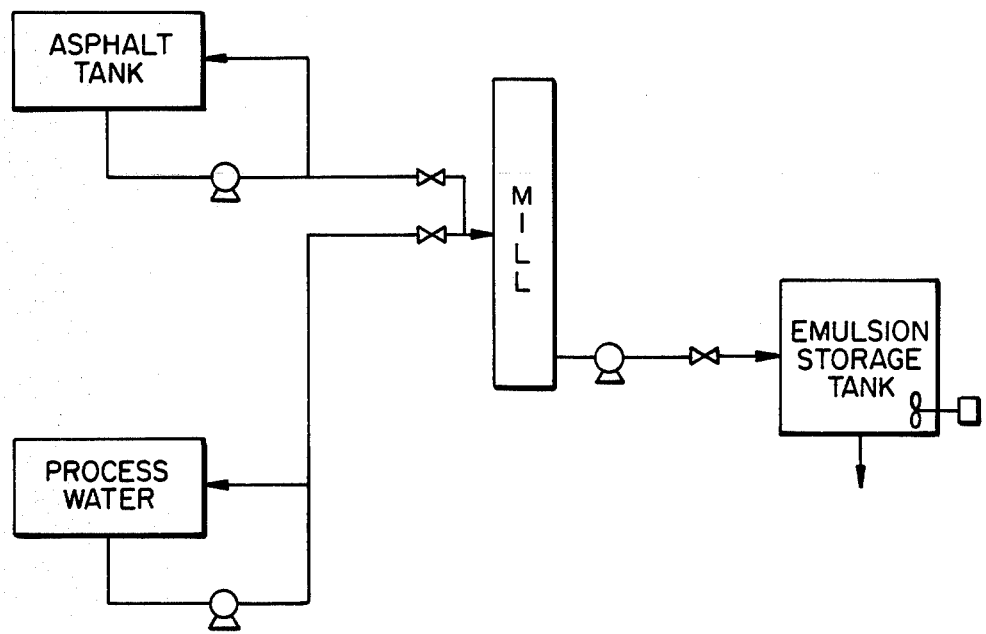

HIGH FLOAT AND RAPID SETTING ANIONIC BITUMINOUS EMULSIONS

BACKGROUND OF THE INVENTION

1. Field of the Invention

The present invention relates to the treatment of pavement surfaces with rapid setting (RS) asphalt emulsions having "high float" (HF). More specifically, the invention relates to the chip seal surface treatment of pavements with certain novel anionic asphalt emulsions having HFRS properties.

In the chip seal surface treatment of roadways a layer of rapid setting aqueous asphalt emulsion is distributed over the surface either before or after a selected aggregate (i.e., stone) is applied thereto. Upon contact with the chosen aggregate, the RS emulsion rapidly breaks and sets, thereby bonding the aggregate to the asphalt and to the surface. This rapid setting action allows the roadway to be open to traffic rather quickly. In general, an emulsion is qualified for the RS designation if the emulsion has a demulsibility or "break" of 60% or more under defined conditions (ASTM D-977).

It is readily apparent that it would be advantageous to provide a chip seal surface treatment resistant to rain and wear, of increased durability, of reduced high temperature flow, and of improved strength and toughness. In this connection, it is often specified that the asphalt emulsion have "high float" (HF). HF refers to the resistance to flow of the asphalt emulsion residue under defined conditions. The residue is the remainder of the asphalt emulsion after water and other volatiles are distilled off (ASTM D-244). Float tests are normally conducted on the residue at 140° F. by inserting a plug of residue in a standard holed-float. When the plug flows sufficiently, the float will sink and the elapsed time is a measure of the residue's resistance to flow under the force of gravity at 140° F. (ASTM D-139). In general, a Float Test result of 1200 seconds or longer qualifies a rapid setting asphalt emulsion for the HFRS designation. In many cases, asphalt emulsions will qualify as HF or RS but not both. State Highway Departments are increasingly requesting the use of chip seal bituminous emulsions qualifying as both HF and RS.

2. Description of the Prior Art

U.S. Pat. No. 2,679,462 describes a water strip-resistant bituminous composition comprising an alkanol amine ester of a monocarboxylic acid, and optionally, tall oil.

U.S. Pat. No. 2,855,319 describes a paving composition formed as mixture of aggregate and bituminous emulsion in which tall oil soap is the emulsifying agent, and further teaches that such substances as oleic acid when used as emulsifiers, if capable of increasing the high temperature hardness at all, do so only to a limited extent. Furthermore, when used with tall oil soap, such substances tend to produce a softening effect as determined by the Float Test, i.e., such substances tend to decrease high temperature hardness, according to the aforementioned U.S. Pat. No. 2,855,319.

U.S. Pat. No. 3,036,015 teaches the use of organic emulsifiers for oil-in-water emulsions such as water soluble soaps of fatty acids (oleic, palmitic, stearic, lauric, naphthenic and tall oil) prepared by reacting the acid or its glyceride with an alkali.

U.S. Pat. No. 4,433,084 describes a method of making an HFRS emulsion from asphalt, tall oil, base and water.

SUMMARY OF THE INVENTION

A high float and rapid setting (HFRS) bituminous emulsion comprises from about 50 to about 75 parts by weight of asphalt; from about 0.01 to about 1.0 parts by weight of anionic emulsifier; from about 0.2 to about 15 parts by weight of carboxylic acid esters; sufficient base to provide said emulsion with a pH greater than about 9; and sufficient water to make the total equal 100 parts by weight. The emulsion residue in the present invention (ASTM D-244) provides a float test result (ASTM D-139) greater than 1200 seconds at 140° F., and the emulsion also provides a demulsibility (ASTM D-977) greater than 60%. The HFRS emulsion also provides for a method of chip seal surface treatment wherein a substantially uniform layer of the emulsion is distributed on the surface either before or after the application of an aggregate adapted for chip seal use onto the surface, whereby the emulsion breaks and bonds the aggregate to the asphalt of the emulsion and to the surface.

BRIEF DESCRIPTION OF THE DRAWING

An apparatus schematic for making the anionic asphalt emulsions of the present invention.

DETAILED DESCRIPTION OF PREFERRED EMBODIMENTS OF THE INVENTION

A stable aqueous anionic asphalt emulsion capable of qualifying as both a rapid setting and a high float emulsion comprises a mixture of asphalt, an anionic emulsifier, excess base, a certain ester and water. The components of the mixture must be present in certain critical concentrations to enable the emulsion to qualify as both RS and HF. The composition is composed of about 50 to about 75, preferably from about 55 to about 70 parts by weight of an asphalt; from about 0.01 to about 1.0, preferably from about 0.15 to about 0.3 parts by weight of an anionic emulsifier; from about 0.2 to about 15, preferably from about 0.4 to about 2 parts by weight of carboxylic acid esters; sufficient base to provide said emulsion with a pH greater than about 9; and sufficient water to make the total composition equal 100 parts by weight.

The asphalts finding use within the scope of the present invention, their compositions and properties, sources, and methods of manufacture are adequately described in Kirk-Othmer Encyclopedia Chemical Technology, 3rd Ed., Vol. 3, Pages 284–327. In particular, the asphalts for use in the emulsions of the present invention are any of the well-known asphaltic materials used to form aqueous anionic emulsions. They are in general the hydrocarbon residue remaining after the refining of petroleum.

The emulsifier component of the emulsion of the present invention is an anionic surfactant, preferably the carboxylic acid salt of an alkali metal, preferably sodium or potassium. Such carboxylic acids preferably contain at least 10 and more preferably at least 14 carbon atoms. Such acids may be straight-chain or cyclic in nature, or mixtures of both. The straight-chain acids are generally aliphatic, although aryl-substituted aliphatic acids are also satisfactory. These acids are both naturally occurring and synthetic acids having an essentially straight-chain structure. They may be saturated or have from 1 to about three double bonds. Occasional branching by alkyl groups does not detract from the usefulness of these acids as emulsifiers in their saponified form. In general, the acids for this use have from 10 to 40 carbon atoms, preferably from 14 to 34 carbon atoms. The naturally occurring fatty acids are a particularly preferred type of acid for use as an emulsifier in a salt form within the scope of the present invention. These emulsifiers are obtained from the saponification of naturally occurring fats and oils, such as tallow, linseed oil, cotton seed oil, castor oil, and the like. Among this group, acids having 16 to 20 carbon atoms, particularly oleic and linoleic acid, are most preferred. The cyclic acids include naphthenic acids, steroidal acids, and alkyl-substituted aromatic acids. Such acids are found in or derived from crude oil and its derivatives (including asphalt), pine resin, pulp mill residues, and the like.

Asphalt contains acids and may even be artificially enhanced by the addition of acid. In asphalts of sufficient acidity, the emulsifier may be formed simply by the addition of base to the asphalt. Such emulsifiers are included within the scope of the present invention.

The term "neutralization" of the acid by base refers to the reaction producing a metal salt of the acid and water, while the term "saponification" of the ester by base refers to the reaction producing a metal salt of the acid and an alcohol.

A particularly preferred anionic emulsifier is made from tall oil. Tall oil is a natural product of pine trees that is isolated by means of the Kraft pulping process. By "tall oil" we intend to cover the various tall oils in their various degrees of purification. A description of the tall oils finding use within the scope of the present invention is found in Kirk-Othmer Encyclopedia Chemical Technology, 3rd Ed., Vol. 22, pages 531–541. The tall oil is an acidic substance finding use as an emulsifier after the acids are converted to their salts by neutralization with added base.

The acids are converted to their salts either before asphalt emulsification or, less preferably, during the emulsification process itself. The salts are formed by mixing the acid and the alkali metal hydroxide in aqueous media. The salt forms instantaneously and functions as the anionic emulsifier when mixed with asphalt.

It is preferred to use enough alkali metal hydroxide, preferably sodium hydroxide or potassium hydroxide, to raise the pH of an aqueous mixture of tall oil or other emulsifier precursor to a pH above 7. The asphalt emulsion of the present invention has a pH preferably above 9, and most preferably a pH of from about 10 to 13. This may require from about 0.05 to about 3 weight percent of alkali metal hydroxide based on the total weight of emulsion. Clearly, the amount of hydroxides to be used depends upon the acid number of the added acid and the acid number of the asphalt.

The ester finding use within the scope of the present invention is the ester of a carboxylic acid and an alcohol. The alcohol portion of the ester is any of the well-known aliphatic mono- and poly-hydroxy alkanes having only carbon, hydrogen and oxygen atoms. Typical alcohols for use in the present invention include methanol, ethanol, 2-propanol, 2-methyl-1-propanol, 2-ethyl-1-hexanol, 1,2-dihydroxy ethane, 2-methoxy-1-ethanol, glycerol, sorbitol, pentaerythritol, and the like. Specifically excluded are the amino alcohols.

The carboxylic acid portion of the ester is generally any of the acids described above as an emulsifier precursor. The critical distinction between the emulsifier and the ester is, of course, that the anionic emulsifier is the metal salt of the carboxylic acid, while the ester is the carboxylic acid ester of an alcohol. Preferably, the acid is a predominantly straight-chain carboxylic acid of about 14 to 34 carbon atoms, preferably of about 16 to 24 carbon atoms, most preferably of from 16 to 18 carbon atoms.

The preferred esters include methyl oleate and the various triglycerides, in particular the triglycerides occurring naturally in vegetable oils and animal fats. In fact, these naturally occurring fats and oils may be used directly in the compositions of the present invention. Such fats and oils are described by Kirk-Othmer Encyclopedia of Chemical Technology, Vol. 9, pages 795–831. A particularly preferred ester is tallow, which, as described by Kirk-Othmer (page 800), is principally the triglyceride of $C_{16}$ and $C_{18}$ carboxylic acids.

METHOD OF MAKING THE EMULSION

It is within the scope of the present invention that emulsions containing the aforementioned esters in certain critical concentrations give asphalt emulsions that pass both the rapid setting test and the float test. The relationship between the molecular weight of the acid component of the ester, the ester concentration, and the concentration of excess base are important to the utility of the asphalt emulsion. In particular, conditions of mixing, storage and application of the emulsion are selected with a view to the avoidance of saponification of the ester. The selection of such conditions of mixing and storage are within the skill of the ordinary worker in the field but should be attentively adhered to.

The emulsion may be prepared by mixing the ester with the asphalt in a pre-blending step before emulsification of the asphalt. The emulsion may also be prepared by adding the ester with the emulsifier in the emulsification step, or the ester may be added to the emulsion after emulsification of the asphalt. While saponification of the ester is avoided in the preparation, handling and application of the emulsion, there should be sufficient excess base present in the emulsion composition such that at least 10% of the ester of a given molecular weight may be saponified under saponification conditions, and preferably, the concentration of excess base is sufficient to saponify all of the ester of this molecular weight under saponification conditions. Higher molecular weight esters will require less base on a weight basis and lower molecular weight esters will require more base on a weight basis. Most preferably, sufficient excess base is present to saponify all of the ester of this molecular weight and provide a 10% excess over that amount Other additives present in the asphalt emulsion of this invention are those additives known to workers of skill in the art of asphalt paving emulsions, such as, mineral clays, compatible inorganic salts and petroleum distillates, used in amounts known to the art but not accounted for in the present emulsion.

A preferred method of preparing the emulsions of this invention is as follows: the ester, in liquid state (melted if necessary), is added to the hot (about 250° F.) asphalt in a blending vessel. At the same time, the emulsifier and excess base are added to the process water in another vessel. Then the treated asphalt and the emulsifier-containing water are pumped at the appropriate rate into a colloid mill. In order to maintain the asphalt temperature, it is preferred that the two liquids join just prior to entering the mill. The mill completely blends these components until a stable oil-in-water emulsion is formed. The product (at about 200° F.) then passes to a storage vessel where it is held at about 150° F. until ready for use. Other methods to obtain this mixture will be obvious to those skilled in the art of asphalt emulsification. While this procedure has been used to minimize the potential conversion of the ester to fatty acids soap which would result in the reduction of demulsibility values, it has been found that an HFRS asphalt emulsion can be readily prepared by the addition of ester and caustic to an RS asphalt emulsion during storage. However, in the latter procedure high temperature storage for long periods of time should be avoided.

The FIGURE shows the overall arrangement of the apparatus for making the anionic emulsions of the present invention. The asphalt tank is maintained at elevated temperatures so that the asphalt has low viscosity. The asphalt and the process water are combined prior to entering the mill. Both the asphalt tank and the process water tank have means to keep the contents of these tanks well mixed. After exiting the mill, the emulsion has a temperature of about 180° F. In addition to adding the ester directly to the asphalt tank, or to the process water tank, or the emulsion storage tank, it may also be added in-line with appropriate valves and connections as is well known in this art.

Using the equipment of the FIGURE, there are several variations in the process by which the compositions of the present invention may be prepared. These variations concern the method by which the emulsifier, the ester and the excess base are added to the system. The emulsifier may be added as such, or it may be made in-situ by adding the acid form of the emulsifier to the process water along with sufficient base to produce the emulsifier by the neutralization reaction which takes place immediately. The ester and the excess base are independently incorporated into the system by:

1. adding them to the process water (the ester may have to be emulsified in the process water);
2. adding them to the finished emulsion in the emulsion storage tank;
3. adding only the ester to the asphalt.

The preferred process involves preparing the emulsifier in-situ in the process water, adding the ester to the asphalt, and charging the excess base to the finished emulsion in the storage tank. Care must be taken in using the other variations because allowance must be made for the acid number of the asphalt.

The acid number of the asphalt is important in choosing the method of making the emulsion. Acid numbers may range from about 0 to as high as about 4, but more generally from 0 to about 1.5. For use in this technology, the acid numbers above about 0.5 are considered high acid numbers, and those below 0.5 are low. The acids in the asphalt causing these acid numbers are good emulsifiers when neutralized with base. When the acid number is low, their presence is not significant in regard to total emulsifier, but when the acid number is high, the quantity of asphaltic emulsifier is important, and can cause a problem in preparing the emulsions of this invention. That is, if the total base, including the base to form emulsifiers plus the excess base of the invention are added via the process water this base may be sufficient to neutralize all or a significant fraction of the asphaltic acid and the acid form of the emulsifier thereby producing too much total emulsifier. This in turn, will prevent fast break and the emulsion will fail the demulsibility test. In some cases it is necessary to add less base than is necessary to effect neutralization of all naturally occurring acids in order to make a rapid set emulsion. This was known in the art of rapid set emulsions before high float properties were required. Therefore, with high acid number asphalts, the preferred process is to add the excess base after the emulsion has been made and stored in the emulsion storage tank. In this case the excess base does not contact the asphalt until the emulsion has been formed and cooled to storage temperature. This minimizes the contact between base and acid groups in the asphalt. The other processes are more prone to give products which do not pass the demulsibility test.

With low acid number asphalts, any of the above process variations is satisfactory, but the preferred method is to add the ester and excess base via the process water because of convenience. However, adding ester to the asphalt and excess base to the process water is also a very satisfactory method for the low acid number asphalts.

The emulsion of the present invention has many uses. Its use as a chip seal surface treatment may be practiced by employing conventional chip seal equipment including conventional aggregate, or stone. In the chip seal surface treatment of the present invention a substantially uniform layer of the HFRS emulsion is distributed over the surface either before or after the aggregate is applied. The breaking of the emulsion on contact with the aggregate and the surface produces an asphalt surface containing aggregate bonded to the treated surface.

EXAMPLES

The following experiments are illustrative of the benefits of the present invention. Various methods of making these emulsions are also illustrated. In all cases the emulsions were made using the apparatus described above. The weight percent concentration of all components of the compositions are given, except water, which is present in an amount sufficient to give 100%.

The compositions shown in Table I were made from a blend of Alaskan North Slope/San Joaquin Valley asphalts. The emulsifier in the acid form is neutralized in the process water with aqueous potassium hydroxide. There is excess potassium hydroxide in the process water. Compositions 5 and 6 contain methyl oleate ester which was added via the asphalt.

TABLE 1

| Composition | Weight Percent of Composition | | | | Demulsibility % | 140° C. Float secs. |
|---|---|---|---|---|---|---|
| | Asphalt | Total Base | Emulsifier* | Ester | | |
| 1 | 66.00 | 0.05 | 0.15 | None | 83 | 235 |
| 2 | 66.00 | 0.21 | 0.15 | None | 56 | 281 |
| 3 | 65.00 | 0.21 | 1.80 | None | 17 | 498 |
| 4 | 65.00 | 0.30 | 1.80 | None | 12 | 3000+ |
| 5 | 66.00 | 0.21 | 0.15 | 0.85 | 93 | 3000+ |
| 6 | 65.00 | 0.26 | 0.10 | 0.80 | 69 | 3000+ |

*Compositions 1–5 are tall oil emulsified while Composition 6 uses stearic acid emulsifier.

Composition 1 is a typical rapid set anionic asphalt emulsion useful for making and overlaying roads. However, it does not meet the high temperature (140° C.) float test. By increasing the base and the amount of tall oil as per the teachings of U.S. Pat. No. 2,855,319 the compositions have improved float test results. Finally, Composition 4 remains stable for over 3000 seconds. But the demulsibility is essentially nil at 12%, and the emulsion no longer qualifies as a rapid set emulsion.

Composition 5 is an example of the present invention wherein an ester, namely methyl oleate, is incorporated into a composition (compare with Composition 2) thereby giving an emulsion which not only passes the float test, but also has an excellent demulsibility of 93%. The quantity of tall oil emulsifier in this composition (#5) is very much below the minimum taught in the above-cited U.S. Patent (0.23% vs. 1.5% based on asphalt). Composition 6 shows the utility of other emulsifiers.

The compositions in Table II illustrate the necessity of using the correct emulsification process with high acid number asphalts. The same asphalt as in Table I having an acid number of 0.5 is compared with Winstone asphalt from New Zealand having an acid number of 0.2. In these cases, the emulsifier (crude tall oil acid at 0.20% concentration), base, excess base, and ester were all added to the process water before emulsification. In each case the asphalt comprised 65.00% of the total composition.

The above results show that the process of making an emulsion wherein all of the ingredients are added to the process water produces compositions which may fail one or both tests when the asphalt has a high acid number (0.5) but produces satisfactory emulsions when the asphalt has a low acid number (0.2).

Utilizing a process wherein the excess base is added to the finished emulsion is a preferred way in which to produce the emulsions of the present invention from high acid number asphalts. This is shown in Table III wherein the asphalt of Table I is used to make an emulsion via a process in which a portion of the base is added to the process water and the remainder, i.e. the excess base is charged to the storage tank. In the process water, the base reacts with the crude tall oil acid (0.20%) to form the emulsifier. In the compositions of Table III, the ester is added to the finished emulsion in the storage tank.

TABLE III

| | | | Weight Percent of the Total Composition | | | | |
|---|---|---|---|---|---|---|---|
| | | | % Concentration of Base in | | | Demulsi- | 140° C. Float |
| Composition | Asphalt | Base | Water | Storage | Ester/conc. | bility, % | secs. |
| 10 | 64.36 | NaOH | 0.03 | 0.21 | Tallow/0.60 | 96 | 3000+, 3000+ |
| 11 | 64.36 | NaOH | 0.03 | 0.21 | Methyl Oleate/0.60 | 79 | 900, 780 |
| 12 | 64.32 | KOH | 0.04 | 0.24 | Tallow/0.60 | 95 | 3000+, 2105 |
| 13 | 64.32 | KOH | 0.04 | 0.24 | Methyl Oleate/0.60 | 83 | 3000+, 3000+ |
| 14 | 65.30 | NaOH | 0.15* | | Methyl Oleate/0.40 | 81 | 3000+ |
| 15 | 60.80 | NaOH | 0.14* | | Methyl Oleate/0.50 | 84 | 2342 |

*The amounts of base in the process water and in the storage tank are unknown but are of about the same ratio as the previous compositions.

TABLE II

| Comp. | Asphalt Acid # | Weight Percent of Composition | | Demulsi- bility % | 140° C. Float secs.* |
|---|---|---|---|---|---|
| | | Base, Kind/conc. | Ester, Kind/conc. | | |
| 6A | 0.5 | NaOH/0.24 | Tallow/0.60 | 47 | 1380, 1375 |
| 7 | 0.5 | NaOH/0.24 | Methyl Oleate/0.60 | 58 | 1052, 1090 |
| 8 | 0.2 | NaOH/0.22 | Tallow/0.90 | 61 | 3000+, 3000+ |
| 9 | 0.2 | NaOH/0.22 | Methyl Oleate/0.90 | 90 | 1286, 1260 |

*Duplicate float tests on the same distillation residue.

The results of Table III show that satisfactory emulsions can be made using the method of adding the ester to the emulsion storage tank. In this method it is necessary to stir the storage tank contents to insure complete mixing of the ester.

Satisfactory compositions can be made from many different asphalts using these teachings. However, some asphalts are more difficult to use than are others. Table IV gives results using a variety of asphalts to give emulsions within the scope of this invention. These compositions are prepared by adding the ester to the asphalt, and the emulsifier and excess base to the process water.

TABLE IV

| | Asphalt** | | Weight Percent of Composition | | | | | Float |
|---|---|---|---|---|---|---|---|---|
| Composition | Kind | Acid # | Asphalt | Tall Oil | Base/conc. | Ester/conc.*** | Demuls. % | sec. |
| 16 | A | 0.5 | 66.0 | 0.15 | KOH/0.07 | MeOl./0.25 | 100 | 236 |
| 17 | A | 0.5 | 66.0 | 0.15 | KOH/0.13 | MeOl./0.50 | 97 | 268 |
| 18 | A | 0.5 | 66.0 | 0.15 | KOH/0.18 | MeOl./0.75 | 79 | 3000+ |
| 19 | A | 0.5 | 66.0 | 0.15 | KOH/0.21 | MeOl./0.85 | 93 | 3000+ |
| 20 | B | 0.2 | 66.0 | 0.15 | KOH/0.08 | MeOl./0.25 | 100 | 305 |
| 21 | B | 0.2 | 66.0 | 0.15 | KOH/0.11 | MeOl./0.40 | 100 | 2550 |
| 22 | B | 0.2 | 66.0 | 0.15 | KOH/0.14 | MeOl./0.55 | 100 | 3000+ |
| 23 | B | 0.2 | 66.0 | 0.15 | KOH/0.08 | Tallow/0.25 | 99 | 1521 |
| 24 | B | 0.2 | 66.0 | 0.15 | KOH/0.10 | Tallow/0.35 | 100 | 3000+ |
| 25 | C | 0.5 | 68.0 | 0.25 | NaOH/0.08 | Tallow/0.30 | 85 | 3000+ |
| 26 | D | 0.5 | 67.0 | 0.25 | NaOH/0.11 | MeOl./0.20 | 88 | 997* |
| 27 | D | 0.5 | 67.0 | 0.25 | NaOH/0.22 | MeOl./0.60 | 91 | 2240 |
| 28 | A | 0.5 | 66.0 | 0.15 | KOH/0.39 | Tallow/1.68 | 72 | 3000+ |

*Average of 990 and 1004, both from the same distillation.
**Asphalt A is the same as in Table I
Asphalt B is a blend of Wyoming Sour and Bow River asphalts.
Asphalt C is from Laketon.
Asphalt D is a blend of Boscan and Maya asphalts.
***MeOl. = methyl oleate A comparison of Compositions 16 and 17 with 18, of 20 with 21 and 26 with 27 shows that the minimum quantity of ester necessary for good float varies with the type of asphalt, and ranges between 0.40 and 0.75 for methyl oleate. A comparison of compositions 20 and 23 shows that under comparable conditions, a satisfactory emulsion can be made using tallow as the ester at lower concentrations than is possible with methyl oleate. The main showing of the data in Table IV is that high float rapid set emulsions can be made from a wide variety of asphalts using the proportions and processes of this disclosure.

What is claimed is:

1. A high float and rapid setting bituminous emulsion comprising:
   (a) from about 50 to about 75 parts by weight of asphalt;
   (b) from about 0.01 to about 1.0 parts by weight of a carboxylic acid salt;
   (c) from about 0.2 to about 15 parts by weight of carboxylic acid esters;
   (d) sufficient base to provide said emulsion with a pH greater than about 9; and
   (e) sufficient water to make the total of (a), (b), (c), (d) and (e), equal 100 parts by weight.

2. A high float and rapid setting bituminous emulsion having an emulsion residue (ASTM D-244) with an ASTM D-139 Float Test value greater than 1200 seconds at 140° F., and an ASTM D-977 demulsibility greater than 60%, comprises:
   (a) from about 50 to about 75 parts by weight of asphalt;
   (b) from about 0.01 to about 1.0 parts by weight of a carboxylic acid salt;
   (c) from about 0.2 to about 15 parts by weight of carboxylic acid esters;
   (d) sufficient base to provide said emulsions with a pH greater than about 8; and
   (e) sufficient water to make total of (a), (b), (c), (d) and (e) equal 100 parts by weight.

3. A high float and rapid setting bituminous emulsion comprising:
   (a) from about 50 to about 75 parts by weight of asphalt;
   (b) from about 0.01 to about 1.0 parts by weight of tall oil;
   (c) from about 0.2 to about 15 parts by weight of tallow;
   (d) sufficient base to provide said emulsion with a pH greater than about 9; and
   (e) sufficient water to make a total of (a), (b), (c), (d) and (e) equal 100 parts by weight.

4. A high float and rapid setting bituminous emulsion comprising:
   (a) from about 50 to about 75 parts by weight of asphalt;
   (b) from about 0.01 to about 1.0 parts by weight of tall oil;
   (c) from about 0.4 to about 15 parts by weight of methyl oleate;
   (d) sufficient base to provide said emulsion with a pH greater than about 9; and
   (e) sufficient water to make a total of (a), (b), (c), (d) and (e) equal 100 parts by weight.

5. A chip seal surface treatment for pavement maintenance comprises distributing a substantially uniform layer of the high float and rapid setting emulsion of claim 1, 2 or 3 on said pavement, either before or after the application of an aggregate adapted for chip seal use onto said pavement; whereby said emulsion breaks and said aggregate is bonded to the asphalt of said emulsion and said surface.

* * * * *